Feb. 24, 1959   J. A. BLASH   2,874,395
LENS CLEANING APPARATUS
Filed June 27, 1957   2 Sheets-Sheet 1

JOSEPH A. BLASH
INVENTOR.

Feb. 24, 1959   J. A. BLASH   2,874,395
LENS CLEANING APPARATUS
Filed June 27, 1957   2 Sheets-Sheet 2
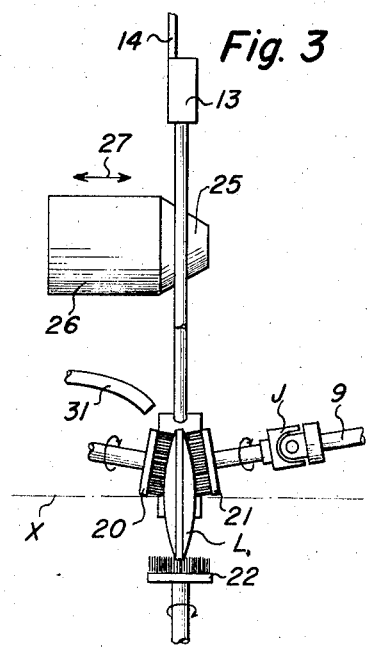
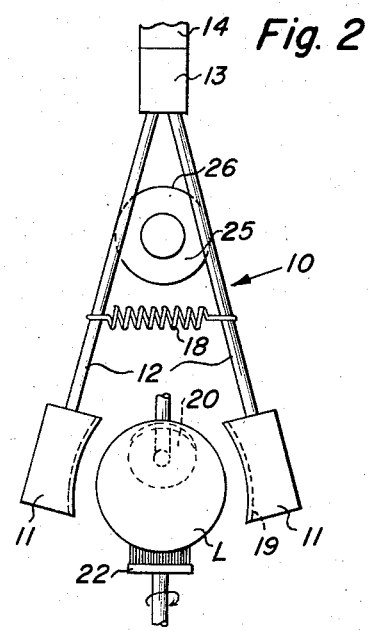
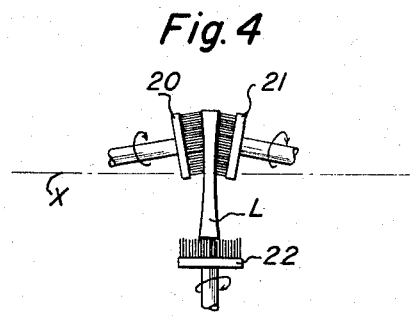
JOSEPH A. BLASH
INVENTOR.
BY
ATTORNEYS

United States Patent Office 2,874,395
Patented Feb. 24, 1959

2,874,395

LENS CLEANING APPARATUS

Joseph A. Blash, Rochester, N. Y., assignor to Eastman Kodak Company, Rochester, N. Y., a corporation of New Jersey Application June 27, 1957, Serial No. 668,565

6 Claims. (Cl. 15—21)

The present invention relates to an improved lens cleaning apparatus, and particularly to such a cleaning apparatus which is used for cleaning lenses just after they have been ground and polished and before they have been mounted in the optical instrument of which they are to form a part.

Currently the best available method of cleaning polished lenses is by hand using a rubbing action of cloth on the surfaces to be cleaned in the presence of suitable solvents. There have been several attempts in the direction of cleaning lenses by automatic means which employed such materials as meal, pumped or sprayed chemicals, sonic machines, and ultrasonic machines such as those used in the metal parts cleaning field. Most of the previous attempts have either been too messy or undesirable from the physiological effects due to vibration. The nearest to a satisfactory method was the sonic machine but the last few particles had to be wiped off the lens with a clean cloth.

The primary object of the present invention is to provide an apparatus for cleaning lenses which is semi-automatic and does as good, or a better, job than the best known hand cleaning techniques.

Another object is to provide a lens cleaning apparatus wherein the polished surfaces as well as the ground edges of the lens are all brushed at the same time in the presence of suitable solvents.

Another object is to provide a lens cleaning apparatus of the type described wherein the brushes hold the lens to be cleaned captive without any other holding means being required. The brushes are rotated and move the lens around so that all surfaces of the lens receive a complete cleaning operation.

And a further object is to provide a lens cleaning machine wherein the lenses to be cleaned are moved through the complete cleaning cycle which may include several stations without the lens having to be touched by hand.

The novel features that I consider characteristic of my invention are set forth with particularity in the appended claims. The invention itself, however, as to its organization, together with additional objects and advantages thereof, will best be understood from the following description when read in connection with the accompanying drawings, in which:

Fig. 2 is an enlarged front view of the brushing station showing the lens carrier opened and the lens supported solely by the brushes, the front brush being omitted for sake of clarity;

Fig. 3 is a side view of Fig. 2, with the near lens gripping jaw omitted to show how a convex lens is held captive by the three brushes during the brushing operation; and Fig. 4 is a schematic view of the brushing station showing how the brushes may be arranged to clean a double concave lens.

Figure 1:
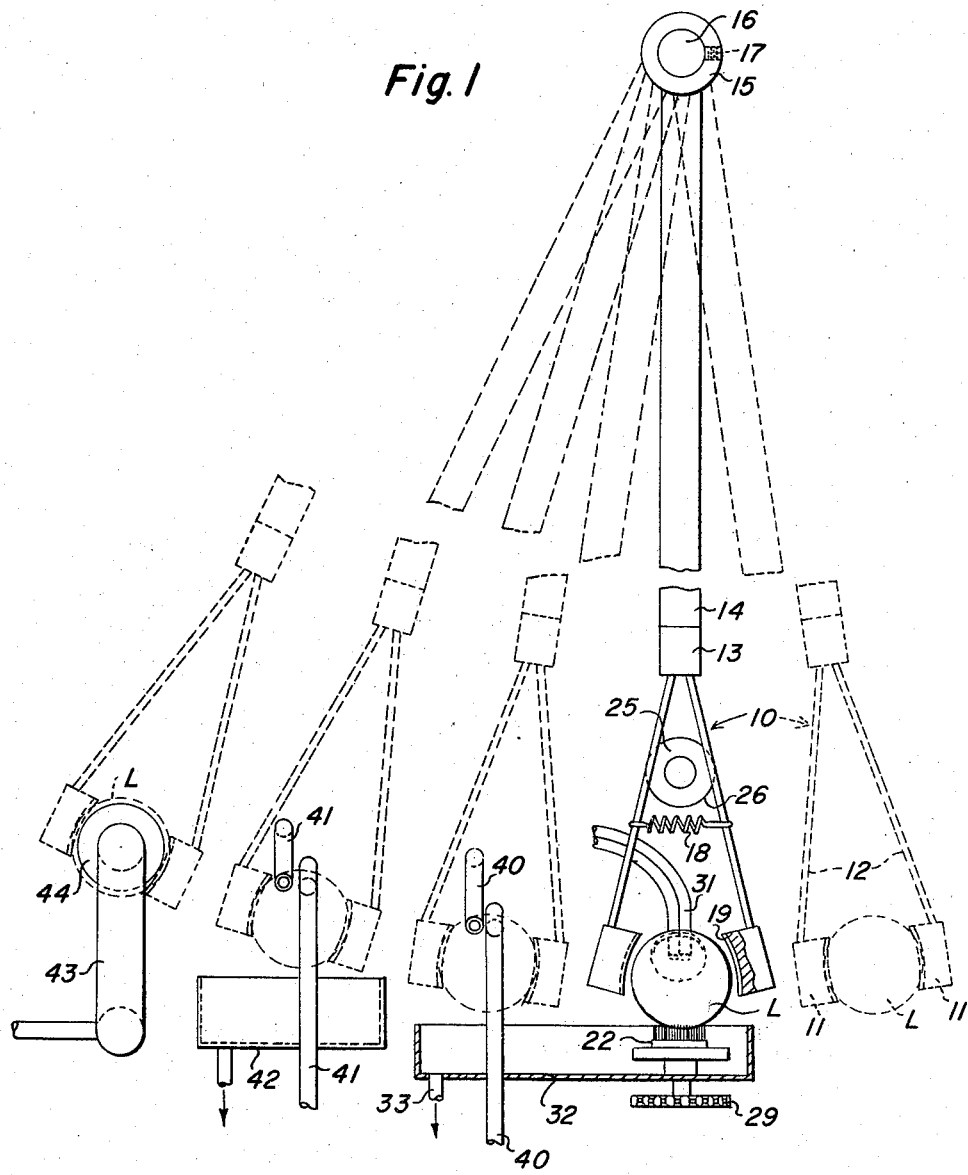
Fig. 1 is a schematic view of a semi-automatic lens cleaning machine constructed in accordance with a preferred embodiment of the present invention, and showing how a lens is moved through five different stations in the complete cleaning process.

In general, the purpose of this invention is to provide an apparatus which brushes both polished surfaces and the edge of the lens at the same time in the presence of suitable solvents. The brushes hold the lens captive without any other holding means being required. All three brushes are driven axially. The two brushes which contact the polished surfaces of the lens cause the lens to rotate so that the third brush can clean all around the edge of the lens. After being brushed, the lens may then be successively moved through a water rinse, then an alcohol rinse and finally into a drying station. A lens is moved through the several stations of the cleaning device by a tweezer-like gripper which grasps it by the edge only, said gripper being opened to free the lens while it is in the brushing station.

Referring now to the drawings, a lens L which has just been ground and polished is snapped into a tweezer-like gripper, indicated generally at 10 while the same is in the loading position shown at the extreme right-hand position of Fig. 1. This lens gripper comprises a pair of jaws 11 fixed to the end of resilient rods 12 which are in turn fixed at their other ends to a block 13 carried on the end of a pendulum arm 14 having a collar 15 fixed to a shaft 16 by a set screw 17. The jaws 11 are normally urged toward one another by either their inherent resiliency, or by a tension spring 18 connecting the two, so that the jaws will clamp the edges of the lens L when it is inserted therebetween. The lens-engaging surfaces of the jaws 11 are preferably made arcuate in correspondence with the circumference of the lens to be handled and are slightly undercut, as shown at 19, to confine the edge of the lens and prevent it from accidentally sliding transversely out of the jaws.

After the lens L to be cleaned is loaded into the gripper 10, the shaft 16 is indexed to move the gripper and the lens carried thereby to the cleaning or brushing station, which is the second position from the right in Fig. 1 and in which the parts are all shown in solid lines. As shown most clearly in Fig. 3, at this brushing station the opposite polished surfaces of the lens L are engaged by brushes 20 and 21 while the edge of the lens is supported by brush 22. Any suitable means can be provided for rotating the brushes 20 and 21 about their axis in an opposite sense, as shown by arrows, so that their frictional contact with the surfaces of the lens will tend to rotate the same relative to the third brush 22. Since it may be desirable to change the angular relationship between the axes of the brushes 20 and 21 relative to the optical axis of the lens, or the horizontal, depending upon the nature of the lens to be handled, as will be set forth hereinafter, I have indicated the drive for each of brushes 20 and 21 as including a universal joint J between the shaft on which the brush is mounted and a driving shaft 9. Also, any suitable means can be provided for rotating the brush 22 about its axis. And since the brush 22 need not be angularly adjustable, I have shown the axle connected to this brush 22 as including a sprocket 29 which may be engaged and driven by a chain. Just as soon as the gripper moves the lens into cleaning position, the jaws 11 are retracted from the lens, see Figs. 1 and 2, so that the lens is held captive solely by the brushes 20, 21 and 22. While any suitable means may be provided for opening the jaws 11 of the gripper, I have shown this as being accomplished by the cone-shaped end 25 of a plunger 26 which is adapted to pass between and spread the rods 12 carrying the gripper jaws as the plunger is moved forwardly, see Fig. 3. This plunger is mounted to reciprocate as indicated by the double ended arrow 27 in Fig. 3, and when it is moved to its forward position, to the right in Fig. 3, it spreads the jaws 11 of the lens gripper, and when it is retracted, it allows the jaws to close and again grip the lens L. This plunger can be reciprocated by any suitable means, such as a cam or air cylinder, not shown, and its actuating means can be cycled with the indexing means for shaft 16 so that as soon as the gripper moves a lens into position between the brushes, the plunger moves forward to release the gripper jaws and then retracts to allow the jaws to again grip the lens after a given time has elapsed which is sufficient to clean the lens.

As clearly shown in Figs. 3 and 4, the axes of the brushes 20 and 21 engaging the polished surfaces of the lens L, while substantially horizontal, have their axes slightly inclined relative to the horizontal by different amounts depending upon whether the lens being cleaned is a convex one or a concave one. If the lens is a convex one, then the axes of brushes 20 and 21 are inclined slightly upward from the horizontal, and the optical axis of the lens X, as shown in Fig. 3, whereas if the lens is a concave one, then the axes of the brushes 20 and 21 are inclined slightly toward the horizontal or optical axis of the lens. This different disposition of the brush axes is necessary to insure that the brushes properly hold the lens captive and properly engage the polished surfaces thereof. It will be appreciated that angular disposition of the brush axes will vary in accordance with the strength of the curves on the lens surfaces, being more pronounced as the lens curvature is increased. To insure the best surface contact between the brushes and the lens surfaces, the bristles of the brushes may be shaped to correspond with the polished lens surfaces, made concave for cleaning convex lenses and made convex for cleaning concave lens surfaces. On the other hand, if the bristles of the brushes are sufficiently long and flexible, it may not be necessary to shape the faces of the brushes to that of the lens since the bristles will flex sufficiently to conform to the lens surface they are to engage. If one machine is to accommodate both convex and concave lenses, then the brushes 20 and 21 must be so mounted and have such a driving means as to permit a shifting of the brush axes between the two positions shown in Figs. 3 and 4. A drive including universal joints as described will satisfy this requirement. It may also be desirable to be able to shift the brushes 20 and 21 toward and away from each other to accommodate lenses of different thickness.

It will be obvious that the size of the brushes 20 and 21 will vary with the size of the lens to be cleaned. As shown in Figs. 3 and 4, the brushes 20 and 21 should have a diameter at least equal to the radius of the lens so that as the lens is rotated by the action of these brushes, all points on the polished surfaces will be contacted by the brushes. While, if the brushes have sufficiently long and flexible bristles the gripper can readily move a lens to and from a position between the brushes 20 and 21 without retracting the brushes from their operative positions, it may be desirable, in some instances, especially when cleaning concave lenses, to retract the brushes from their operative positions just before the gripper 10 moves a lens into and out of position therebetween. Such a brush retracting means, not shown, could be of any suitable type and be cycled with the indexing of the gripper to keep the brushes retracted until the gripper moves a lens into cleaning position, then close on the lens as the gripper releases it, and finally again be retracted after a given time and just as the gripper 10 re-engages the lens to move it out from between the brushes. During the brushing operation a suitable soap solution is pumped onto the lens and brushes through a pipe 31, here shown as a double pipe, and the solution is collected in a trough 32 having an outlet 33. This solution after leaving trough 32 may be filtered to remove any solid particles and be recirculated to inlet pipe 31. In order not to waste the cleaning solution, the pumping system should be turned off at all times when no lens is in cleaning position between the brushes.

After the lens has been cleaned by the brushes, the gripper 10 re-engages the same and indexes it to the next station and between a pair of water pipes 40 where the lens is given a water rinse. During this rinse the gripper 10 maintains its hold on the lens L. The rinse water is collected in trough 32 which extends under this rinsing station.

The gripper then indexes the lens L to the next station where it is given an alcohol rinse which removes all of the water. The alcohol is fed in streams onto opposite sides of the lens from pipes 41 between whose outlet ends the lens is moved and held. The alcohol is collected in trough 42 and recirculated after filtering. It may be necessary to redistill the alcohol used in this rinse operation. Trials have shown that continued use of the same alcohol for final rinse began to leave a deposit on the lenses because alcohol takes on water from the water rinse station.

The gripper then indexes the lens into a hot air blast where it is dried. Blasts of hot air are conducted through pipes 43 against opposite surfaces of the lens while it is held by the gripper. The ends of each pipe 43 terminate in a bell or funnel-shaped end 44 which has substantially the same diameter as the lens so that the hot air is allowed to spread over the entire area of each lens surface. When the lens leaves the drying station, it is perfectly clean and dry and needs no final wiping with a cloth. It is then lifted from the gripper by the operator by means of tweezers which engage only the edge of the lens in order to prevent the application thereto of any finger grease or lint, if the operator wears gloves, and is ready for finally testing and assembling without further cleaning.

It has been found that if a trichlorethylene solution is pumped onto the brushes 20 and 21 a very satisfactory degreasing unit is provided. Degreasing is distinguished from ordinary cleaning in this art in that degreasing concerns the removal of dirt and particles from the lens which are more or less firmly attached thereto, i. e., blocking pitch, etc., whereas cleaning generally refers to removing residue which is incidental to the grinding and polishing operations and handling, such as rouge, glass particles, finger prints, etc. I have found that using a trichlorethylene solution at the brushing station makes it possible to completely remove any dried blocking pitch which might remain on the lenses after they have been deblocked. Accordingly, if lenses are being handled which have been blocked during the grinding and polishing operation, a degreasing station might be added to the cleaning machine for the removal of dried blocking pitch from the lenses before final cleaning. Such degreasing station would differ from the brushing station already described only in that a solution which will dissolve or soften the blocking pitch, i. e., trichlorethylene, would be pumped onto the lens and brushes instead of a soap solution. If a degreasing station is applied to the machine, it might also be desirable to add an alcohol rinse station ahead of the brush cleaning station in order to adequately remove the degreasing solvent and residue from the lens before the soap solution is applied.

It has been found that a cleaning cycle of seven seconds is possible with this machine even when it includes a degreasing station. Lenses cleaned in this machine have been found to be as good or better than those cleaned by conventional techniques. Several hundred lenses cleaned by this machine were stored with controlled lenses cleaned by the best hand cleaning methods. At the end of a three-and-one-half month storage period a thorough inspection showed that the machine-cleaned lenses had withstood humidity and changing temperature as well as the hand cleaned lenses. Several different materials have been tried as the brush bristle material. To date nylon seems to hold up better than natural pig bristles or brass wire bristles which have a tendency to mark the lens surfaces. The indexing of the lens gripper 10 can be done by turning the shaft 16 by hand or a power drive having a desired cycling operation can be used.

While for purposes of disclosure I have shown the machine so arranged and equipped with only one lens gripper that only one lens can be cleaned at a time, it is noted that it could be readily made to handle a plurality of lenses at one time and thereby step up its rate of production. For example, the several stations through which each lens passes could be arranged in a straight line and a plurality of lens grippers could be mounted in spaced relation on a conveyor to move through said stations in sequence. With such an arrangement one lens gripper could be loaded with a lens while other and previously loaded grippers were positioning lenses in each of the degreasing, cleaning, rinsing and drying stations.

While I have shown and described certain specific embodiments of my invention, I am fully aware that many modifications thereof are possible. My invention, therefore, is not to be limited to the precise details of construction shown and described but is intended to cover all embodiments coming within the scope of the appended claims.

Having thus described my invention, what I claim as new and desire to secure by Letters Patent of the United States is:

1. A lens cleaning apparatus consisting of three rotatable brushes, two of which are arranged in spaced relation to engage the opposite polished surfaces of a lens while the third supports the lens from below and at its edge, whereby said lens is held captive and is supported solely by said three brushes, and means for rotating the two brushes engaging the lens surfaces in opposite directions whereby frictional contact between the same and said surfaces serves as the sole means for rotating said lens relative to said third brush which cleans the edge of the lens, and means for directing a stream of cleaning solution onto said lens and brushes.

2. A lens cleaning apparatus according to claim 1, in which the brushes engaging the surfaces of the lens are circular and have a diameter substantially equal to the radius of said lens, and in which the brushes are in direct opposition at the upper half of said lens.

3. A lens cleaning apparatus according to claim 1, in which the lens to be cleaned is a double convex one, and characterized in that the two brushes for engaging the surfaces of the lens are circular and have a diameter substantially equal to the radius of said lens, said brushes positioned to engage the lens above its optical axis and having their axes inclined upwardly from the optical axis of the lens so that the brushes properly engage the convex surfaces of the lens.

4. A lens cleaning apparatus according to claim 1 in which the lens to be cleaned is a double concave one, and characterized in that the two brushes for engaging the surfaces of the lens are circular and have a diameter substantially equal to the radius of said lens, said brushes positioned to engage the lens above its optical axis and having their axes inclined downwardly toward the optical axis of the lens so that the brushes properly engage the concave surfaces of the lens.

5. A lens cleaning apparatus according to claim 1 including a lens holder for gripping and holding the lens by its edge, means for moving said lens holder from a loading position where a lens is inserted thereinto to a cleaning position wherein the lens is positioned between said three brushes, and means for opening said lens holder after it reaches said cleaning position so that the lens will be held captive solely by the brushes and will be free to be rotated thereby.

6. In a lens cleaning apparatus the combination of a brushing station comprising three rotatable brushes, two of which are arranged in spaced relation to engage the opposite polished surfaces of a lens while the third supports the lens from below and at its edge whereby the lens is held captive by said three brushes while the two opposed brushes by their rotation rotate the lens relative to the third for cleaning the edge, and means for directing a stream of cleaning solution on said brushes; a rinsing station spaced from said brushing station and including means for directing streams of liquid over the opposite surfaces of a lens; a drying station spaced from said rinsing station and including means for directing blasts of warm air onto opposite sides of a lens; and means for gripping a lens to be cleaned by its edges and moving the lens from station to station with a delay at each of said stations, and means at said brushing station for disengaging said lens gripper from the lens just as soon as the lens is positioned within the brushes to become captivated thereby so that the lens will be held captive solely by the brushes during the brushing operation, and means for re-engaging said lens gripper at the end of the brushing operation for moving the lens to the remaining stations.

References Cited in the file of this patent

UNITED STATES PATENTS

| | | |
|---|---|---|
| 775,790 | Yeomans | Nov. 22, 1904 |
| 1,859,626 | Laing | May 24, 1932 |
| 1,978,838 | Gavlak | Oct. 30, 1934 |

FOREIGN PATENTS

| | | |
|---|---|---|
| 58,402 | Norway | Sept. 20, 1937 |